April 8, 1958
L. W. STAPLES ET AL
FORMED SPRING UNITS AND SPRING ASSEMBLIES
OF SINUOUS DESIGN
Filed Jan. 18, 1957
2,829,880
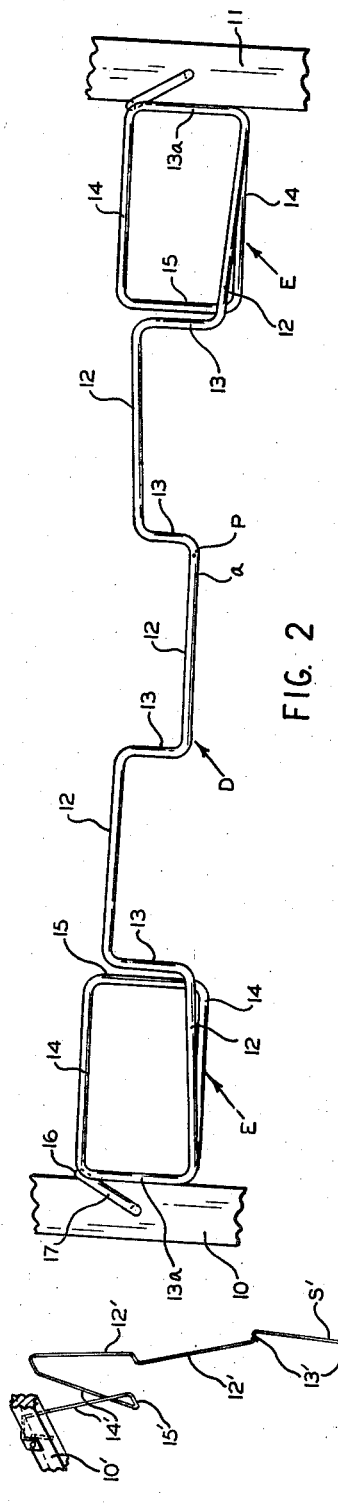
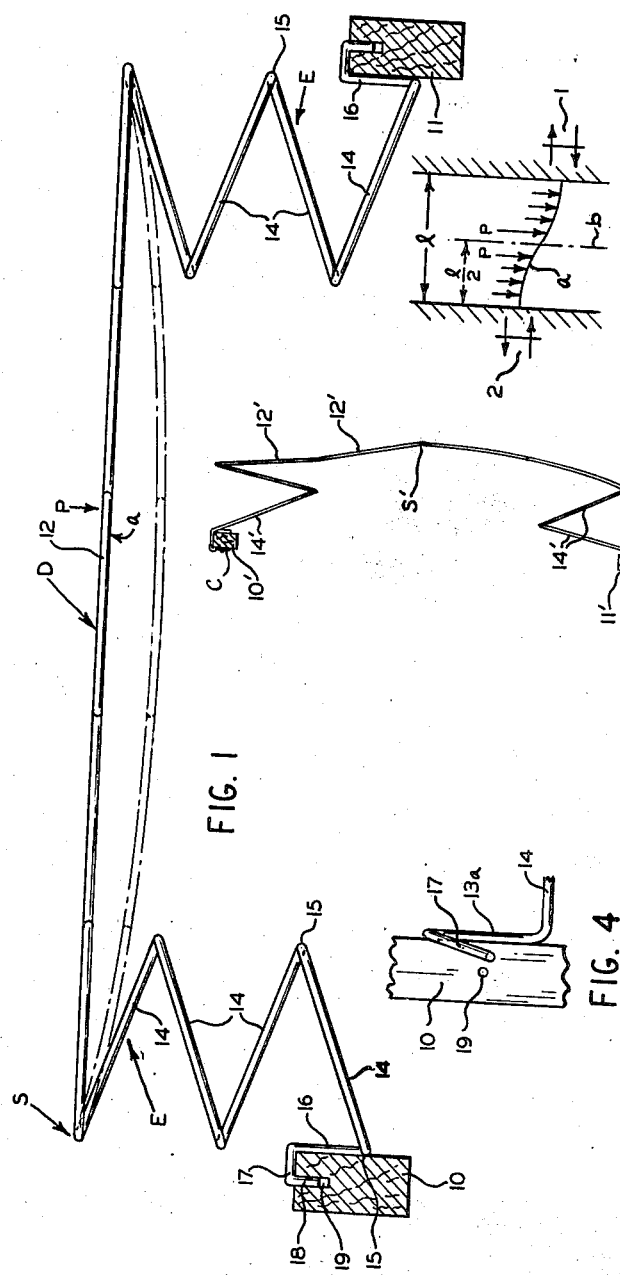
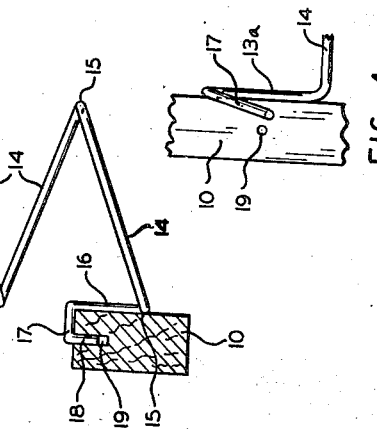
INVENTORS
LYNN W. STAPLES
RAYMOND D. STROUT
BY
*Harman & Harman*
ATTORNEYS

United States Patent Office 2,829,880
Patented Apr. 8, 1958

2,829,880
FORMED SPRING UNITS AND SPRING ASSEMBLIES OF SINUOUS DESIGN

Lynn W. Staples and Raymond D. Strout, Saginaw, Mich., assignors to Saginaw Wire Products, Inc., Bridgeport, Mich., a corporation of Michigan Application January 18, 1957, Serial No. 634,852

16 Claims. (Cl. 267—1)

This invention relates to formed spring units and spring assemblies of sinuous design such as are presently in use in the furniture and automotive industries and more particularly to certain novel and highly useful improvements therein.

Spring manufacturers have for some time been concerned with the design of springs which have certain predetermined deflection characteristics when a load is applied to them. It is desirable that the springs in vehicle and furniture seats and backs assume a certain predetermined contour under load which is comfortable to the occupant. Since most of the weight of the occupant is normally applied to seats at a point approximately two thirds from the front edge of the assembly, it is desirable that the springs offer the greatest resistance to deflection at this point. In backs the pressure distribution must be such as to provide support for the small of the back.

Various sinuous type springs have been designed which offer areas of greater and lesser resistance to deflection over their lengths. Two patents relating to such springs, of which we are aware, are the patent to Neely, No. 2,639,763 and the patent to Flint et al. No. 2,684,844. Both of these springs provide areas of varying "stiffness" by varying the lengths of the so-called spacer bars in the load application or deck section of the spring. When the torsion bars are closer together as at the forward portion of the load application section or thigh engaging area, the resistance to deflection is less than at the area where the maximum load is imposed. The purpose of this construction is to produce less pressure on the legs of the occupant. Conversely, the torsion bars are connected by spacer bars of greater length at the point where the maximum load is supposed to be normally imposed.

While the Flint and Neely springs do accomplish the purpose for which they were designed in the sense that they provide springs having areas of different yield under load, these springs have certain inherent disadvantages. Because they vary the resistance of the springs in the load application areas thereof by providing spacer bars of different length, the design of springs to provide the contours specified by different manufacturers is complicated. In such formed wire springs no one portion of the load application area alone resists the load, of course, which is actually resisted to some degree by every torsion bar and spacer bar in the area. Because the load is distributed and is resisted cumulatively, the design of each spring to achieve a particular contour has until now had to be accomplished by trial and error and this is a costly procedure. The varying lengths of the spacer bars in the prior art springs apparently must be adjusted to the uniform length of the torsion bars which is arbitrarily chosen for the particular seat or back in which the springs are to be mounted. If it is desired to modify a spring which has been contour tested to arrive at a spring which differs more than slightly from the tested spring so far as resistance to load in a particular area is concerned, the modification can not be readily accomplished by varying the length of the spacer bars for the reason that it is the torsion bars which for the most part control the degree of deflection. Additional torsion bars must be introduced or subtracted to achieve the effect dependent on whether the spring is to be stiffer or weaker at that particular point and this change in the number of torsion bars used affects the resistance offered by other areas of the spring. A change in the number of torsion bars necessitates spacer bars of different lengths in other areas of the deck section and usually the whole design of the spring must be completely altered.

It is a primary object of our invention to provide a spring which can be designed on the drafting board to provide a particular contour under load. If minor changes then need be made at particular points, localized changes can be rapidly and easily made in the spring of the instant invention without materially affecting the resistance of the spring at other points along its length.

It is another prime object of the invention to provide a spring assembly which is a considerable improvement over prior springs because it makes the most efficient use of the wire used to form it, considering the load to be applied and the diameter of wire to be used.

The instant invention involves a considerable departure from known concepts of spring design and offers to the art a new spring strip which is far more practical to manufacture than prior art strips. Broadly the invention contemplates the provision of a sinuous spring having in the load application or deck section thereof substantially straight torsion bars of different lengths joined by substantially straight spacer bars of considerably greater length than the torsion bars. The invention in another aspect thereof contemplates the use of straight spacer bars of a uniform maximum length which is predetermined in advance for the load to be applied and the diameter of the wire which is to be used. The variation in spring resistance at various points over the length of the spring is controlled by varying the length of the torsion bars which apparently substantially control the resistance to load offered by the spring at various points over the length of the spring. We have discovered that a relatively slight change in the length of a particular torsion bar materially affects the deflection of the spring at that point. By changing the length of the torsion bars only, without varying the most efficient length of spacer bar which can be used or adding additional torsion bars at particular points which would decrease the length of the spacer bars and change the contour of other portions of the spring under load, we can materially alter the contour which the spring will assume. Thus, to modify the load resisting characteristics of the spring considerably, relatively slight changes need be made in die mechanism suitable for producing such springs such as illustrated in the instant assignee's copending application, Serial No. 600,021 filed July 25, 1956, and entirely new dies and wire bending machines need not be provided even to produce springs which assume widely varying contours.

The new spring strip will for any given load and desired contour use a minimum amount of wire and when it is considered that millions of such wires are produced annually the saving of several inches of wire per spring or even lesser lengths of wire is obviously a huge saving in the overall cost of production of the springs.

Thus prime objects of the invention are to provide a spring designed so that its contour under load can be varied as desired without requiring time consuming and expensive changes in die mechanism for forming the wire on a quantity production basis; to provide a spring which can be designed on the drafting board rather than by trial and error, and any minor changes then made by simply altering slightly the length of a torsion bar or two; and to provide a spring of very simple and reliable construction which most efficiently uses the wire from which it is constructed and accordingly conserves wire.

A further object of the invention is to design a spring strip which is particularly well suited to furniture constructions wherein cushions are used in that it can assume a flatter contour under a particular load than was previously possible with conventional springs and provides a maximum of comfort for the occupant.

Another object of the invention is to design a spring strip which with spacer bars of uniform length better carries the seat padding whose tie wires can be uniformly spaced.

A still further object of the invention is to provide a spring which is capable of exerting sufficient resistance to deformation to provide the desired contour without requiring that the spacer bars be pre-arched or stay elements connecting the end supporting sections and deck sections of the spring be used.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

In the drawings:

Figure 1 is a side elevational view showing our novel spring strip mounted between the front and rear rails of a furniture seat frame.

Figure 2 is a top plan view thereof.

Figure 3 is a force diagram picturing a single spacer bar in side elevation.

Figure 4 is a fragmentary top plan view showing the end of the spring in non-deformed condition prior to assembly of the end on a rail.

Figure 5 is an isometric, elevational view showing a back spring of modified construction.

Figure 6 is a diagrammatic edge elevational view illustrating a predetermined contour which is typically formed in the spring.

Referring now more particularly to the accompanying drawings, a letter S generally indicates a spring strip which is constructed in accordance with the invention and is shown for convenience of illustration mounted in position between the front and rear rails 10 and 11 of a conventional seat frame. While we have shown a furniture seat frame, it is to be understood that the spring strip of the invention is also suitable for use in vehicle seats and backs, and the like, as well. There will, of course, be a plurality of such spring strips connected between the rails of the frame as in the aforementioned patents which will be joined by a border wire in the usual manner for operation generally in unison. The springs will be covered with padding and fabric as shown in the patents mentioned and in the case of the instant illustration a cushion will, of course, be supported on the springs.

The instant invention is, in one aspect thereof, concerned with the deck portion D of the spring which is to be distinguished from the end portions E of the spring which support the deck portion or load engaging portion. In the deck portion D are spacer bars 12 of equal length joined by torsion bars 13 of varied length. At the front and rear edges of the strip torsion bars 13a join the deck portion D to the end portions E. While the spacer bars 12 are straight, they are not parallel nor do they lie in the same vertical plane. The radii at the juncture of the torsion bars 13 and spacer bars 12 are such that the alternately opposite loops can be termed generally rectangular shaped loops which are to be distinguished from the zig-zag type loops of the Neely patent previously referred to, which does not, of course, have straight or linear spacer bars.

The length of the spacer bars 12 is determined for a given diameter of wire by the maximum load which the spring must support and, of course, a considerable safety factor is introduced. Generally speaking, the weight of the hips will be transferred to the springs at a point about two thirds of the length of the spring from the front end thereof, however, the spring must be designed so that any part of the deck portion can take this maximum load. The spacer bars 12 in the instant spring are made as long as possible for a given load so that the least amount of wire can be used in the spring, which then can be said to most efficiently use the wire from which it is formed. If the adjacent spacer bar 12 is considered in terms of the effect its length will have on the torsional force imposed by a given load on the torsion bar which is expected to be most affected by the load imposition, the maximum length the spacer bars can be, can be determined. The allowable torque which any torsion bar can take without exceeding its elastic limit and causing it to "set" will, of course, be known for the particular wire being used and will be the same regardless of the length of the torsion bar. If the allowable torque is then divided by the load according to the formula $$L_s = \frac{Ta}{P}$$

(where $L_s$ is the length of the spacer bar applying the torque, $Ta$ is the allowable torque, and P is the maximum effective load which can be applied by an occupant at the end of a spacer bar considering that the load is distributed), the maximum length which any spacer bar can be will be known. It is assumed that the maximum load condition exists for the purpose of calculation, i. e. that load P is applied at one end of a spacer bar (as in Figs. 1 and 2). The load P is that load which must be resisted by the particular spacer bar and the fact that the other portions of the spring aid in supporting the load P is taken into consideration for the spring shown. In a seat wherein five springs are to be used to support a load of about 200 pounds, the load P is .07W (where W is the maximum weight to be supported by the springs). All spacer bars in the deck portion of the instant spring will then be of this length and if the load is imposed anywhere on the deck portion of the spring there is no danger of "set." Actually the maximum load which is transferred by the hips of the occupant, is, of course, distributed over the spacer bar $a$ as shown in Figure 3. Each spacer bar is then analogous to a pair of cantilever beams with free ends abutting, which are held at the ends by opposite couples resulting from the resistance of the torsion bars.

Aside from the fact that the maximum length spacer bar should be used because several inches of wire can be saved per spring, it is important that the maximum length spacer bar be used from the standpoint of greater comfort. Greater flexibility and deflection of the individual spacer bars can be obtained with maximum length spacer bars. In Figure 3 I have demonstrated the forces acting on spacer bar $a$ (which is considered to be split along the line $b$ into a pair of cantilever beams) assuming a distributed load P is applied as shown in Figure 3. The load P applied to spacer bar $a$ by the load P would be resisted by the couple 1 at the end of one beam and couple 2 at the end of the other beam. Couples 1 and 2 represent the resistance of the torsion bars at opposite ends of spacer bar $a$ to the torque applied to them. The deflection of the spacer bar in a vertical plane can be calculated similarly to the formula for deflection of a cantilever beam which is $$D = K \frac{Pl^3}{3EI}$$

(P being the load tending to move the cut end of the spacer bar, $l$ being half the length of the spacer bar, E being the modulus of elasticity of the material, and I being the moment of inertia of a cross-section about the neutral axis and K being a constant reflecting the degree of cantilever restraint). The amount of deflection increases very rapidly then when the length of the spacer bar is increased so it can be seen that it is highly important that each spacer bar be the maximum allowable length. In fact poor results are obtained and much control of deflection is lost if the length of the spacer bars is not at least twice the length of any "inside" torsion bar 13.

The supporting ends E of the spring comprise four downwardly inclined alternately oppositely disposed bars 14 joined by lateral bars 15 to form conventional fish-mouth sections as shown. The bars 14 could be of sinuous configuration if it were desired to decrease their rigidity, of course, however for convenience sake I have shown them as straight bars. At the lower end of each end section E a section 16 extends upwardly from the lowermost bar 15 and has a horizontally extending section 17 terminating in a downwardly depending leg 18 which is received in an opening 19 provided in the upper surface of the rail 10 or 11. The section 17 extends angularly relative to the plane of the lowermost bars 15 in the end sections E and the general plane of the rails 10 and 11, and in normal unstressed position the sections 17 which bear on the upper surfaces of the rails are less angular than when deformed so that the attaching ends of the end sections snap into position.

In Figures 4 I have shown a spring end as it appears in unstressed condition. Ends 18 can be inserted into the openings 19 by stretching the entire spring longitudinally and particularly the portions 17. The inwardly displaced loop sections bear against the inner side walls of the rails, of course, and retain the spring once it is mounted in position. Because the load is distributed to plural walls of the rails lighter wood or metal rails can be used. When weight is applied to the springs, the springs are only more securely anchored and the load is applied to the inner side walls of the rails as well as to the upper surfaces thereof.

The resistance offered by the spring at various points on the deck portion D thereof is varied by varying the lengths of the torsion bars 13 as shown, for example, in Figure 1. As noted previously we have discovered that the torsion bars afford the major control of the deformation of the spring when a load is applied. The shorter the torsion bar the greater resistance the immediately adjacent portions of the deck section will have to deflection. For maximum comfort it is desirable that the spring deflection be adjusted in accordance with the load it carries at various points along its length. The torsion bars 13 are therefore shorter in the area about two thirds of the length of the spring from the front end thereof where the greatest load is carried. The thighs of the occupant transfer some load of course, however the load transmitted at the front end of the spring is borne in large part by the front end section E. What might be termed an ideal deflection contour for drop-in (cushion type) furniture seats is demonstrated by the broken lines in Figure 2. The deflection is substantially uniform at the ends of the spring. For greatest comfort, it is desirable that the contour be relatively flat, which effect in the instant spring is effected by providing spacer bars of maximum deflectability in combination with torsion bars having a comparatively greater resistance to deflection. In the latter case the resistance of importance is, of course, to torsional deflection or twist. Because the spacer bars which are as soft as possible while the torsion bars are mainly depended upon to determine the contour, a flatter contour can be obtained without sacrificing any comfort. In fact, since the spacer bars, which are of maximum length, have more body engaging surface by far than the torsion bars, a seat incorporating the springs of the instant invention is much more comfortable than conventional seats. Particularly is this true for persons lighter or heavier than the person of average weight because all of the spacer bars have a maximum softness.

In certain seats a deeper contour is desired than in others. In such cases it is not necessary to design an entirely new spring as must be done with springs of other designs. For instance, in the springs of the previously mentioned patents, when it is desired to obtain a deeper contour at particular points, the lengths of the spacer bars must be changed and additional torsion bars must be added. Thus, to make localized changes the whole design of the spring is affected and new dies and die mechanism are required to form the springs. Further, the proper shape must be achieved by trial and error because a change in the length of the spacer bars does not greatly affect the resistance of the spring to load and for a given length spring it means that other spacer bars in other areas of the spring must be changed in length.

The spring strip of applicants' invention avoids these difficulties because the length of the torsion bars need merely be changed slightly to change the depth of the contour at a particular point. This change does not require decreasing or lengthening of the spacer bars in the spring which can always be maintained at maximum length to provide maximum comfort. Further, the new spring can be produced by the original die mechanism with merely a simple and minor adjustment of the dies of the instant assignee's previously mentioned copending application.

In Figures 5 and 6 I have shown a back spring S' of similar construction mounted on upper and lower rails 10' and 11', which might be the rails of a motor vehicle back. The deck portion of the spring S' includes, as previously, torsion bars 13' joined by spacer bars 12' and the attachment ends E' have bars 14' joined by lateral sections 15'. It will be observed that the deck portion of the modified spring is formed in a predetermined contour to provide proper support for the small of the back and this is done by pretwisting or presetting the torsion bars 13'. Any contour can, of course, be achieved and the resistance to load of any portion of the spring is varied accordingly. The spacer bars 12' remain straight or linear so formation of the spring is a relatively simple matter. A back formed of springs which are precontoured as indicated firmly support the spine and when the load on the back is increased, as when the vehicle is suddenly braked, optimum support is offered the backs of the occupants. In Fig. 6 the lower two spacer bars appear slightly bowed and this occurs when the spring is secured in place by the clips C rather than in the spring forming operation.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

We claim:

1. A spring unit comprising; supports; a spring strip including an elongated, load engaging, deck section with front and rear ends, and supporting end sections for the deck section secured on said supports; said deck section including portions of varying stiffness made of wire bent back and forth into a sinuous form having straight lengths of spacer bars joined to straight lengths of torsion bars to provide rectangular loops wherein each spacer bar resists deflection in a manner analogous to a pair of cantilever beams and each torsion bar resists the load torsionally; the torsion bars being varied in length over the length of portions of varying stiffness to conform to the load carried by a particular section of the deck section and produce a predetermined contour in the spring under load; and the spacer bars joining the said torsion bars being of substantially greater lengths than said torsion bars to provide greater deflection in a longitudinal plane.

2. A spring strip comprising; an elongated, load engaging, deck section and supporting end sections for the deck section; said deck section including a single resilient wire having portions of varying stiffness bent sinuously back and forth with straight lengths of spacer bars joined to straight lengths of torsion bars to provide rectangularly shaped loops wherein the spacer bars function as beams to resist a load applied substantially over the length of the deck section and the torsion bars resist the tendency of the load to twist them; the torsion bars being of different length over portions of varying stiffness to most efficiently provide a predetermined contour under load and being substantially shorter in length than the spacer bars.

3. The combination defined in claim 1 in which the torsion bars are shorter in length near the rear of the deck portion where the maximum load is carried.

4. The combination defined in claim 2 wherein the length of the spacer bars is according to the formula $$L_s = \frac{t_a}{P}$$

where $L_s$ is the length of the spacer bar, $P$ is the maximum load applied at any point along the deck portion, and $t_a$ is the allowable torque any torsion bar formed of the material in the particular diameter can withstand without permanent "sets" occurring.

5. A spring unit comprising; spaced supports; a spring strip including an elongated, load engaging, deck section and supporting end sections for the deck section secured on said supports; said deck section being formed of wire bent back and forth sinuously to provide straight lengths of spacer bars joined to straight lengths of torsion bars to provide rectangular loops wherein each spacer bar resists deflection as a beam and each torsion bar resists the load torsionally, all of the torsion bars being substantially shorter in length than the spacer bars and being of varied length over the length of the deck section to conform to the variably distributed load normally carried by the deck section and produce a predetermined contour in the spring under load.

6. The combination defined in claim 5 in which the spacer bars are at least twice as long as any inside torsion bar.

7. A spring unit comprising, front and rear rails, a resilient spring wire formed into a sinuous, elongated, deck section and substantially V-shaped fishmouth end sections at the ends thereof and under the front and rear ends of the deck section, said fishmouth sections having attaching sections snapped on said rails at the lower ends thereof; said deck section including portions of varying stiffness comprising alternately oppositely disposed, rectangular loops formed with straight lengths of torsion bars of different length to provide a predetermined contour in the deck of the spring dependent on the load application over the length of the deck section joined to straight lengths of spacer bars of substantially greater length than said torsion bars.

8. In a spring unit structure; a pair of spaced frame members at least one of which has a spring end receiving opening in the top surface thereof, a sinuous spring strip extending transversely to said members, said strip having at least one attaching end provided thereon adapted to distribute pressures to different faces of one of said frame members comprising; a loop portion extending angularly to said strip so as to be disposed adjacent a side of one of said frame members and bear thereagainst in a lateral direction when a load is applied to the spring strip, a section extending angularly from the loop portion across a top surface of the said frame member, said latter section having a terminal depending end received in said opening.

9. The combination defined in claim 8 in which said opening in the top of said frame member is spaced further from the said side wall of the member than the said depending end is from said loop portion of the resilient spring.

10. A spring strip comprising; an elongated, load engaging, deck portion and supporting end sections for the deck portion, said deck portion comprising a single resilient wire bent sinuously back and forth with straight lengths of spacer bars joined to straight lengths of torsion bars of varied length to provide rectangularly shaped loops wherein the spacer bars function as beams to resist a load applied to the deck section and the torsion bars resist the tendency of the load to twist them, the torsion bars being pretwisted to a predetermined degree to provide a predetermined contour in the spring and being substantially less in length than the spacer bars.

11. The combination defined in claim 10 in which the spacer bars are of equal maximum length.

12. A spring unit comprising; front and rear rails; a resilient spring wire formed into a sinuous, elongated, deck section and substantially V-shaped fishmouth end sections at the ends thereof and under the front and rear ends of the deck section; said fishmouth sections having attaching sections snapped on said rails at the lower ends thereof; said deck section comprising alternately oppositely disposed, rectangular loops formed with straight lengths of torsion bars of different length to provide a predetermined contour in the deck of the spring dependent on the load application over the length of the deck section joined to straight lengths of spacer bars of uniform maximum length for the maximum load to be carried at any point on the deck section; one of said rails having an opening in a wall thereof; at least one of said attaching sections including an angular section in the plane of said rails to bear against the inner side of one of the rails, and a terminal end extending from said angular section normally offset with relation to the opening where the angular section is against the rail received in said opening.

13. A spring strip comprisng an elongated, load engaging deck having ends from which the deck may be supported; said deck including portions of varying stiffness made of wire bent back and forth into a sinuous form having straight lengths of spacer bars joined to straight lengths of torsion bars to provide generally rectangularly shaped loops wherein each spacer bar resists deflection as a beam and each torsion bar resists the load torsionally; the torsion bars being substantially shorter in length than the spacer bars and being of varied length over the length of the portions of varying stiffness to conform to the variably distributed load normally carried by the deck and produce a predetermined contour in the deck under load.

14. The combination defined in claim 13 in which spaced apart support rails are provided to which said ends are connected and some of said torsion bars are pretwisted to a predetermined degree.

15. The combination defined in claim 13 in which said ends and deck are formed from a single resilient wire which has all the torsion bars in the deck section substantially shorter in length than the spacer bars in accordance with the contour desired under load.

16. The combination defined in claim 1 in which said supports are the spaced apart front and rear rails of a seat frame and at least one of said end sections for the deck section includes a V-shaped fishmouth section joined to said deck section.

References Cited in the file of this patent

UNITED STATES PATENTS

| | | |
|---|---|---|
| 1,430,248 | Morse | Sept. 26, 1922 |
| 2,341,015 | Blumensaadt et al. | Feb. 8, 1944 |
| 2,684,844 | Flint et al. | July 27, 1954 |